United States Patent [19]

Hunt et al.

[11] Patent Number: 5,611,492
[45] Date of Patent: Mar. 18, 1997

[54] REFUSE TIRE GRINDER/SEPARATOR

[75] Inventors: James R. Hunt, Tucker; Jerry L. Hunt, Rossville, both of Ga.

[73] Assignee: Hunt Industries Inc., Tucker, Ga.

[21] Appl. No.: 431,769

[22] Filed: May 1, 1995

[51] Int. Cl.$^6$ .......................... B02C 19/00; B02C 19/12
[52] U.S. Cl. .................. 241/23; 241/24.14; 241/24.17; 241/DIG. 31
[58] Field of Search .......................... 241/23, 24, 260.1, 241/DIG. 31, 24.14, 24.17

[56] References Cited

U.S. PATENT DOCUMENTS

| | | | |
|---|---|---|---|
| 4,784,340 | 11/1988 | Tatai et al. | 241/301 |
| 4,813,614 | 3/1989 | Moore et al. | 241/23 |
| 4,997,137 | 3/1991 | Tolonen | 241/248 |
| 5,223,543 | 6/1993 | Iovino | 521/44.5 |
| 5,232,170 | 8/1993 | Yang | 241/260.1 |
| 5,316,224 | 5/1994 | Dobozy | 241/30 |
| 5,316,225 | 5/1994 | Geyer | 241/74 |

*Primary Examiner*—John M. Husar
*Attorney, Agent, or Firm*—John Lezdey & Assoc.

[57] ABSTRACT

The invention provides an apparatus and method for grinding and separating pre-softened refuse tire portions. The pre-softened portions are compaction ground with tapered auger positioned in a housing. The ground material which is discharged from the housing is thereafter magnetically separated into a metal refuse fraction and a rubber crumb product fraction. Optionally a second stage apparatus is provided. The second stage apparatus differs from the apparatus substantially only in respect to further comprising a second housing for enclosing said second auger which has rifling on the inner surface thereof and which runs counter to the flights of said second auger; and means for rotating said second housing counter to said second auger. Crumb rubber product from the apparatus is fed into the inlet of the second stage. A 200 mesh crumb rubber is thereafter recovered from the outlet of the second stage.

5 Claims, 1 Drawing Sheet

REFUSE TIRE GRINDER/SEPARATOR

FIELD OF THE INVENTION

The instant invention involves the recovery of a rubber crumb product from refuse tire portions which have been pre-softened. A preferred soaking solution and process for pre-soaking is disclosed in applicant's co-pending application Ser. No. 08/333,839, filed Nov. 3, 1994.

BACKGROUND ART

Due in greatest part to the ever increasing concern for our environment, the problems associated with the disposal of refuse vehicle tires has received much attention in the recent years. Burial of refuse tires has proven to be an unsatisfactory disposal alternative. Thus, with an increasing frequency they have been stored in dumps, wherein they present a constant fire hazard and otherwise, a convenient breeding ground for mosquitos and other non-beneficial insects that flourish within pocket of water trapped in them.

Although it is recognized that refuse tires can be burned for the generation of power, cost efficiency and environmental considerations have made this alternative unfeasible in most instances.

Re-capping of old tires has proven to be unfeasible since the longer molecules which impart strength to the rubber are broken down during the remolding process.

Recycling would appear to be the only reasonable alternative to deal with the growing problem. There are, however, many problems that effect the cost efficiency of various recycle schemes which have been proposed in prior years. Modern tires are of a composite construction which can include bead wires or wire mesh, and steel or fiber belting, in addition to the profitably recoverable rubber component. Hence, energy and equipment intensive solids separation processes have been used in the past to recover the rubber. Exemplary of such schemes are U.S. Pat. Nos. 3,721,392 and 3,658,267 to Burwell, which both show removal of rubber from refuse tires by abrasion with an endless belt or sander.

U.S. Pat. Nos. 3,693,894 to Willette and 1,498,935 to Shull disclose cutting members as an alternative to the abrasive members of Burwell.

U.S. Pat. No. 5,322,792 to Peguy, teaches the shredding of worn tires by high speed grinder chains, while U.S. Pat. No. 4,840,316 to Barclay, discloses a high speed, rotating rasp.

All of the foregoing machines employ high speed components, which have the common disadvantages of higher energy consumption, heat buildups more rapid apparatus component wear and longer down-time.

On the other hand, the instant invention avoids the disadvantages of the prior art, by providing an apparatus and method which treats pre-softened portions of refuse tires, thereby enabling the denuding of the rubber component from the metal or fiber component of the portions, by slow speed compaction grinding.

Therefore, It is an object of the instant invention to provide an apparatus and method which recover rubber crumb from refuse tires with a reduced energy requirement.

It is a further object of the invention to provide an apparatus and method which recover rubber crumb from refuse tires with minimal wear to apparatus components.

It is a further object to provide a method and apparatus of simple and more reliable design which provides reduced down-time and increased cost efficiency.

SUMMARY OF THE INVENTION

The invention provides an apparatus and method for grinding and separating pre-softened refuse tire portions. The pre-softened portions are compaction ground with tapered auger positioned in a housing. The ground material which is discharged from the housing is thereafter magnetically separated into a metal refuse fraction and a rubber crumb product fraction. Optionally a second stage apparatus is provided. The second stage apparatus differs from the apparatus substantially only in respect to further comprising a second housing for enclosing said second auger which has rifling on the inner surface thereof and which runs counter to the flights of said second auger; and means for rotating said second housing counter to said second auger. Crumb rubber product from the apparatus is fed into the inlet of the second stage. A 200 mesh crumb rubber is thereafter recovered from the outlet of the second stage.

As disclosed in applicant's co-pending application Ser. No. 08/333,839, now abandoned, which is incorporated herein by reference, whole tires, halves, quarters, or chips, are softened by pre-soaking in a suitable softening solution, at atmospheric pressure or greater for a period ranging from about two (2) to about six (6) hours. Typical of such softening solutions is composition comprising essential oil in a concentration of about 95.0% to about 99.0%, and a nonionic component is a concentration of about 1.0% to about 5.0%.

After soaking, the softened tire portions feed is introduced into the apparatus of the invention. They are compaction ground by means of a tapered screw auger within the apparatus, which strips and thereby frees the softened rubber from the metal wires or wire mesh, and/or fibers until they are discharged in the form of mixture for rubber crumb and refuse metal. Upon discharge from the apparatus, the refuse metal refuse is magnetically separated from the rubber crumb.

DETAILED DESCRIPTION OF THE INVENTION

Whole tires, halves, quarters, or chips, are softened by pre-soaking in a suitable softening solution, at atmospheric pressure or greater for a period ranging from about Two (2) to about Six (6) hours. As disclosed in applicant's co-pending application Ser. No. 08/333,839, now abandoned, a preferred composition for the pre-soaking solution comprises about 95.0% to about 99.0% essential oil and about 1.0% to about 5.0% of a nonionic component. It should be noted that where whole tires are presoaked, they can thereafter be reduced to smaller portions before being fed to the apparatus of the invention.

Figure 1:
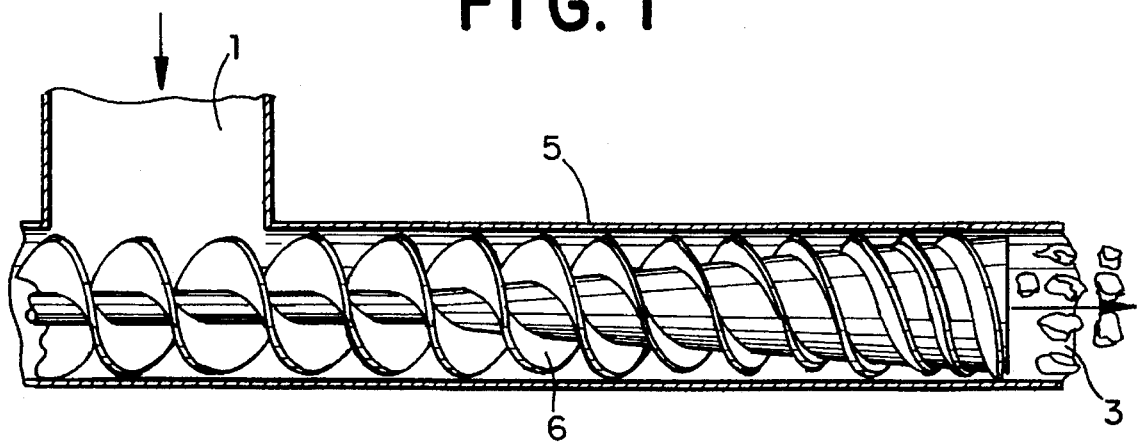
FIG. 1 illustrates, in detail, the tapered auger of the invention.
Figure 2:
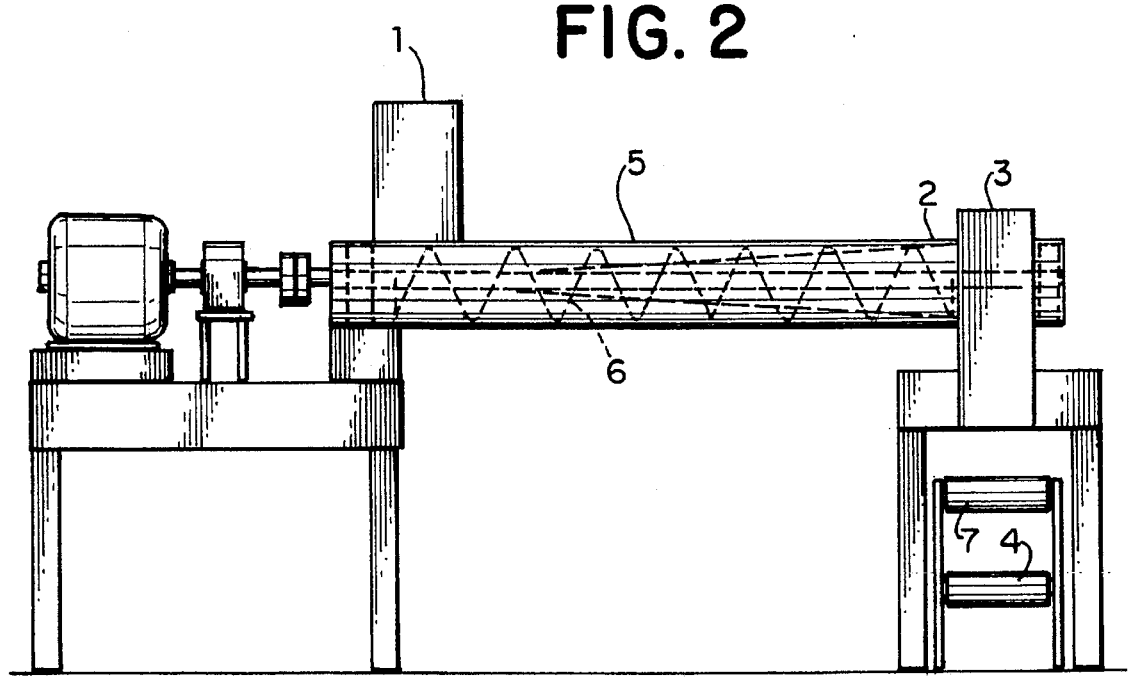
FIG. 2 illustrates an elevation view of the apparatus of the instant invention.

FIG. 1 shows certain details of FIG. 2. Referring first to FIG. 1, a tapered auger 6 is mounted within a housing 5, having an inlet 1, and an outlet 3, from which rubber crumb and refuse metal wire and/or fibers are discharged. The depth of the free volume within the housing varies from about 4.0 inches to about 8.0 inches at the inlet end of the housing to about 0.25 inches at the outlet end of the housing.

Referring to FIG. 2, when the apparatus is in operation, a feed of pre-soaked refuse tire portions is fed into inlet 1. The feed is compaction ground as it is moved through the housing 5, by tapered auger 6. The shearing action between the auger and the inner surface of the housing functions to abrade the softened rubber of the re-enforcing bead wire or wire mesh of the tire portions, until the feed is reduced to a mixture of rubber crumb and metal refuse which is discharged at outlet 3. The mixture is thereafter passed through a magnetic separator (not shown), where the metal component is removed and deposited on a metal conveyor 7. The specifics of the magnetic separator is well known in the art, and is therefore not shown here in detail. The recovered rubber crumb fraction can optionally be passed through a screen separator (not shown), to provide a 5 to 8 mesh rubber crumb product that is recovered at rubber conveyor 4. Screen separators are well known in the art, thus details of the optional screen separator are not shown here.

Optionally, the 5 to 8 mesh product can be further processed to provide a final rubber crumb product of as low as 200 mesh. The instant invention contemplates a second stage apparatus similar to the above described apparatus. Although it is substantially similar, the second stage, nonetheless has significant differences. These differences consist of: (a) a housing that can be rotated counter to the rotation of the second stage screw auger; (b) "rifling" on the inner surface of the housing that runs counter to the flights of the second stage tapered screw auger; (c) means for driving the housing in counter rotation to the second stage screw auger; and, (d) The depth of the free volume at the outlet end of the second stage housing within the second stage housing is reduced to some dimension less than 0.25 inches, sufficiently small to provide a 200 mesh rubber crumb product.

Method of Operation

According to a preferred embodiment of the invention, there is provided a method for recovering rubber crumb from refuse tire portions. The method comprises the steps of pre-softening the refuse tire portions with essential oils; passing the pre-softened tire portions through an auger of predetermined taper and of a material capable of interacting with an electromagnetic field so as to form a rubber crumb; electromagnetically separating metal from the rubber crumb and then recovering the separated metal and rubber crumb.

The method also includes: providing a second stage auger of predetermined second taper within a housing which runs counter to the flights of the second auger, and feeding the separated crumb into said second housing, and then withdrawing a product rubber crumb from the second housing.

The separated crumb can be treated with a microwave vacuum reactor cell according to the process described in U S. Pat. No. 5,362,759. The microwave vacuum reactor cell is equipped with a stirrer and is charged with the minus 40 mesh rubber crumb, and evacuated to a vacuum of at least 28 inches of mercury. The rubber crumb is stirred while being simultaneously subjected to microwave energy, as a result, uniform heating is carried out throughout the charge to desulfurize the rubber and to vaporize any process oil entrapped in the rubber. The vulcanized rubber is heated by microwave to a temperature of about 50° to 100° C., preferably 78° C. The heating time is generally about 15 minutes. The temperature is controlled by a temperature sensor (not shown) and automatically controls the operation of the microwave vacuum reactor cell. The vapors emanating from the process oil entrapped in the rubber and the gases generated by the desulfurization reaction are vented through a vapor outlet means. The process oil is separated, from the other components, condensed, recovered, filtered and pumped to the process oil storage tank to be recycled to a pressure vessel. Generally the recovery of the process oil ranges from about 90–98%. The other gases emanating from the vulcanized rubber are recovered and safely removed. After cooling a clean small high quality particle rubber product is discharged into storage bins.

The reclaimed rubber produced by the process of this invention is useful as raw material in the manufacture of ceiling tiles, floor tiles, shingles, tires, tubes, belts and other rubber and consumer products.

Suitable conditions of the present invention may vary widely depending upon the type of elastomer being reclaimed and the capacity of the equipment being employed. Soaking times may be in the range of at least about 30 minutes to about 20 hours. Suitable pressures for soaking per square inch and preferably from about 60 psi to 100 psi. Soaking temperatures may range from about 0° C. to 100° C. and preferably from about 20° C. to 80° C. The microwave vacuum cell reactor used for microwave heating was rated for 5 kilowatts (KW) of output and 2000–3000 megahertz (MH) of frequency. The microwave vacuum cell reactor is constructed of materials, e.g., stainless steel.

While the process has been described in reference to the treatment of rubber (synthetic, natural or mixtures thereof), it is contemplated that the process is equally applicable to other hydrocarbons including polyolefins and various classes of other plastics such as polyesters, polyamides (e.g., nylon) and other high molecular weight resins and polymers.

In the broad aspect of the present invention, it is suitable to use an essential oil containing limonene, linalool, mycene, mycene or mixtures thereof. Examples of some essential oils which are suitable for the purpose of this invention include oils of orange, orange flowers, bitter orange, orange terpene, lemon lime, peppermint, spearmint, fir, fleabane, lavender, dill, celery, bergamot and pine oil. If desired, mineral spirits can be combined with the essential oils to lower cost in an amount of 30% to 50% by weight of mixture.

It is preferred to use pure d-limonene, linalool, mycene or mixtures thereof. It is most important to mix either the essential oil or the pure compound of d-limonene, linalool, mycene or mixtures thereof with a commercial nonionic surfactant. The nonionic surfactant is added to the processing oil in proportions ranging from about 1 to 5 weight percent and services to aid in penetration and wet out of the rubber chips and to act as a lubricant in the grinding process.

Suitable nonionics that may be used are the condensation products of a long chain ethylene oxide moiety with an aliphatic alcohol or alkyl phenol. Illustrative nonionic surfactants are available on the market under the tradename of "Neodol" products by the Shell Oil Company; "Tergitol" products by Union Carbide, and "Alfol" products by Continental Oil Company.

For large scale operations essential oils referred to as citrus oils are a by-product of citrus juice production are available in large quantities at relatively low cost, have a pleasant odor and are environmentally safe.

Although the invention has been described with reference to certain preferred embodiments, it will be appreciated that many variations and modifications my be made consistent with the broad principles of the invention. It is intended that the preferred embodiments and all of such variations and modifications be included within the scope and spirit of the invention, as defined by the following claims.

What is claimed is:

1. A method for recovering rubber crumb from refuse tire portions comprising the steps of:
   a) presoftening said refuse tire portions with an essential oil;
   b) abrading the presoftened tire portions with a tapered auger;
   c) magnetically separating magnetic portions from the abraded tire portions;
   d) subjecting the separated rubber portions to microwave energy under a vacuum and at a temperature between about 50° to 100° C. whereby volatile oils are removed; and then
   e) recovering the rubber product.

2. The method of claim 1 wherein said rubber product is desulfurized in step d).

3. The method of claim 1 wherein said essential oil is a citrus oil.

4. The method of claim 1 wherein said essential oil is recovered.

5. The method of claim 1 wherein step a) is carried out at a pressure of 60 psi to 100 psi and at a temperature from about 0° C. to 100°.

* * * * *